United States Patent
Xiong et al.

(10) Patent No.: US 11,790,174 B2
(45) Date of Patent: Oct. 17, 2023

(54) ENTITY RECOGNITION METHOD AND APPARATUS

(71) Applicant: UBTECH ROBOTICS CORP LTD, Shenzhen (CN)

(72) Inventors: Weixing Xiong, Shenzhen (CN); Li Ma, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 268 days.

(21) Appl. No.: 17/134,494

(22) Filed: Dec. 27, 2020

(65) Prior Publication Data

US 2021/0200952 A1 Jul. 1, 2021

(30) Foreign Application Priority Data

Dec. 27, 2019 (CN) .......................... 201911379640.7

(51) Int. Cl.
*G06F 40/295* (2020.01)
*G06F 40/40* (2020.01)
*G06F 18/214* (2023.01)
*G06F 18/2415* (2023.01)

(52) U.S. Cl.
CPC .......... *G06F 40/295* (2020.01); *G06F 18/214* (2023.01); *G06F 18/2415* (2023.01); *G06F 40/40* (2020.01)

(58) Field of Classification Search
CPC ........ G06F 40/295; G06F 40/40; G06F 16/35; G06F 16/367; G06F 40/30; G06F 16/248; G06F 16/93; G06F 40/253; G06F 40/56; G06F 16/3338; G06F 40/284; G06F 40/47; G06F 40/58

See application file for complete search history.

(56) References Cited

U.S. PATENT DOCUMENTS

| | | | |
|---|---|---|---|
| 10,872,601 B1* | 12/2020 | Acharya | G06F 40/295 |
| 10,896,295 B1* | 1/2021 | Shenoy | G10L 15/187 |
| 2009/0281791 A1* | 11/2009 | Li | G06F 40/284 |
| | | | 704/9 |
| 2018/0114524 A1* | 4/2018 | Itoh | G10L 15/065 |
| 2019/0065460 A1* | 2/2019 | Xin | G06F 40/295 |
| 2019/0318737 A1* | 10/2019 | Kiss | G06F 40/284 |
| 2020/0065374 A1* | 2/2020 | Gao | G06F 40/295 |
| 2020/0104362 A1* | 4/2020 | Yang | G06F 40/30 |
| 2020/0184019 A1* | 6/2020 | Yu | G06F 16/3329 |
| 2020/0302118 A1* | 9/2020 | Cheng | G06F 40/295 |
| 2020/0342055 A1* | 10/2020 | Patra | G06F 40/237 |
| 2021/0034701 A1* | 2/2021 | Fei | G06F 40/295 |
| 2021/0149993 A1* | 5/2021 | Torres | G06F 40/284 |

* cited by examiner

*Primary Examiner* — Abdelali Serrou

(57) ABSTRACT

The present disclosure discloses an entity recognition model training method and an entity recognition method as well as an apparatus using them. The entity recognition model training method includes: obtaining a training text and matching the training text with a database to obtain a plurality of matching results; processing the matching results to obtain a plurality of feature vectors corresponding to the matching results; obtaining a word vector of each word in the training text by processing the training text; and training an initial entity recognition model based on the feature vector and the word vector to obtain an entity recognition model. By using this training manner, the entity recognition model obtained can have an improved accuracy of entity recognition.

12 Claims, 6 Drawing Sheets

ENTITY RECOGNITION METHOD AND APPARATUS

CROSS REFERENCE TO RELATED APPLICATIONS

The present disclosure claims priority to Chinese Patent Application No. 201911379640.7, filed Dec. 27, 2019, which is hereby incorporated by reference herein as if set forth in its entirety.

BACKGROUND

1. Technical Field

The present disclosure relates to intelligent device technology, and particularly to an entity recognition model training method and an entity recognition method as well as an apparatus using them.

2. Description of Related Art

Since named entity recognition (NER) has always been an important part of information extraction and a basic task in natural language processing, it has wide applications in various technologies. Conditional random field (CRF) is the mainstream model for named entity recognition. With the development of deep learning technology, in named entity recognitions, the combined use of bi-directional long short-term memory (BiLSTM) deep learning models and CRF (i.e., BiLSTM-CRF) has become more and more common. Although BiLSTM-CRF has become the most mainstream model for the deep learning based entity recognition method, its accuracy in semantic understanding is still not ideal, and the information accuracy for some word slots is still low, which leads to incomplete understanding to the expression of the user in a dialogue system.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

The present disclosure will be described in detail below with reference to the drawings and embodiments.

Figure 1:
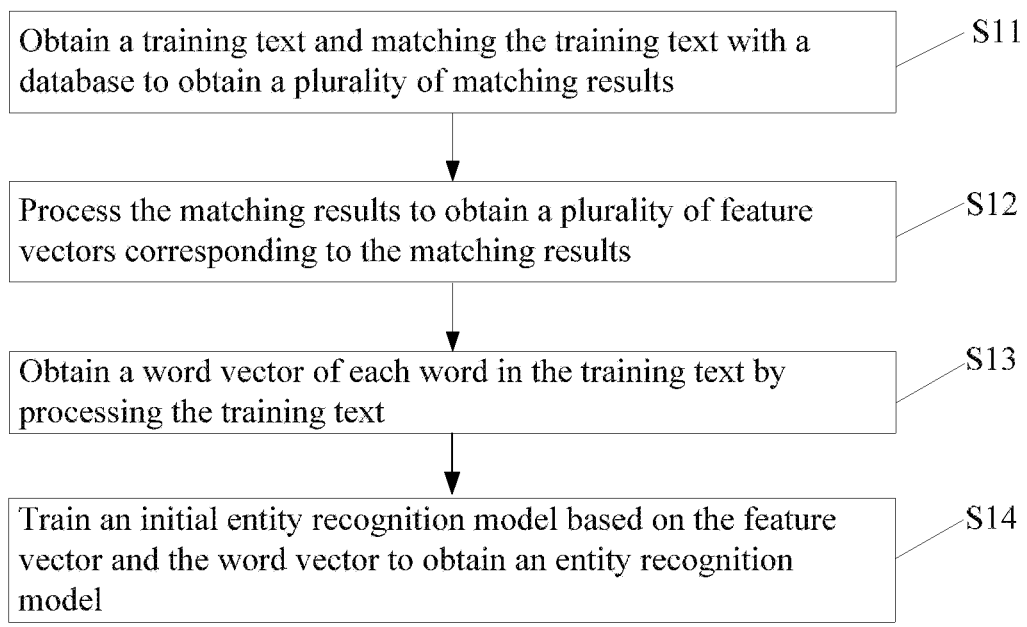
FIG. 1 is a flow chart of an embodiment of an entity recognition model training method according to the present disclosure.
Figure 3:
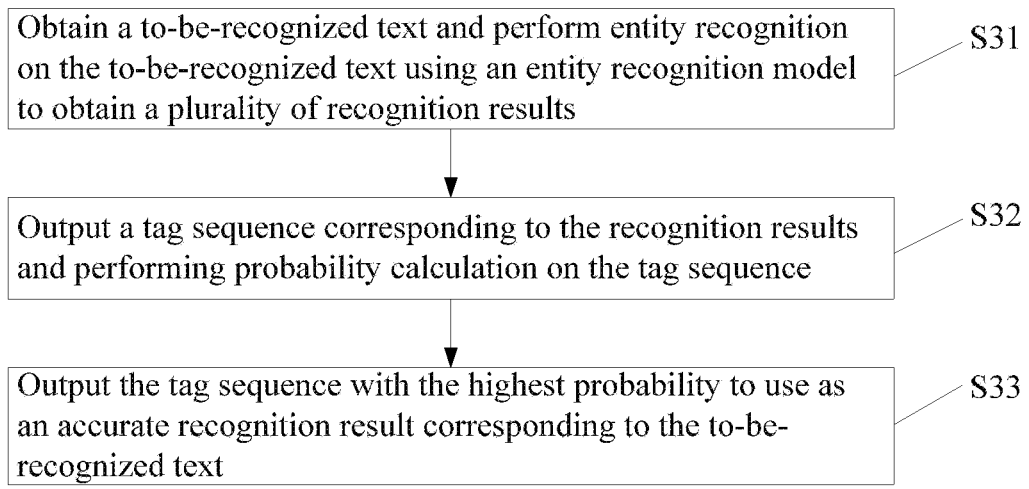
FIG. 3 is a flow chart of a first embodiment of an entity recognition method according to the present disclosure.
Figure 4:
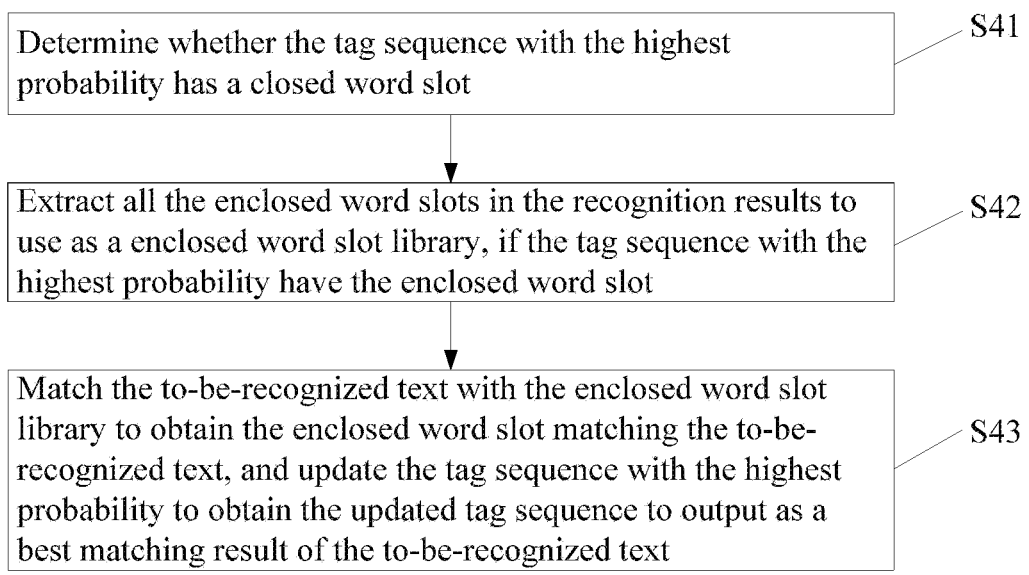
FIG. 4 is a flow chart of a second embodiment of an entity recognition method according to the present disclosure.
Figure 5:
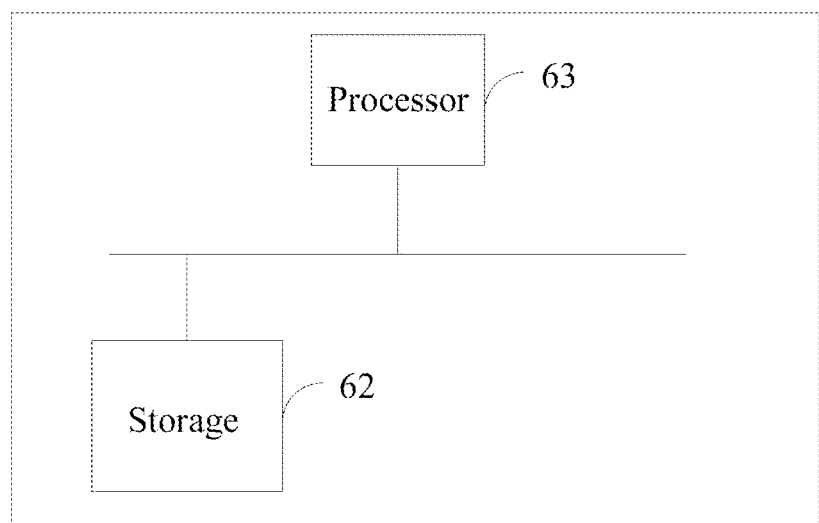
FIG. 5 is a schematic block diagram of an embodiment of an entity recognition apparatus according to the present disclosure.
Figure 6:
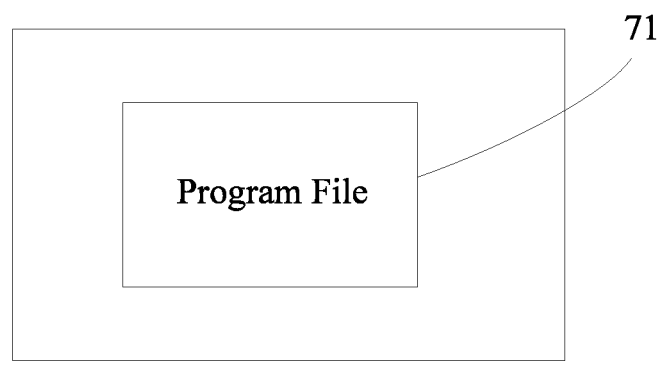
FIG. 6 is a schematic block diagram an embodiment of a computer-readable storage medium according to the present disclosure.

FIG. 1 is a flow chart of an embodiment of an entity recognition model training method according to the present disclosure. In this embodiment, an entity recognition model training method is provided. The method is a computer-implemented method executable for a processor, which may be applied to an entity recognition method as shown in FIG. 3 or FIG. 4, implemented through and applied to an entity recognition apparatus as shown in FIG. 5, or implemented through a computer-readable storage medium as shown in FIG. 6. As shown in FIG. 1, the method includes the following steps.

S11: obtaining a training text and matching the training text with a database to obtain a plurality of matching results.

For example, the obtained training text is "I want to listen to Taylor Swift's Taylor Swift album." In which, "Taylor Swift's" in the forgoing sentence has the objective structure and will be disassembled in English, so the sentence will become "I want to listen to Taylor Swift's Taylor Swift album." and will be matched with the database, so as to obtain the entities contained in the sentence as a matching result. The entity can be, for example, "Taylor Swift". The database is an organized collection of data stored and accessed electronically from a computer system, which includes a plurality of entities.

S12: processing the matching results to obtain a plurality of feature vectors corresponding to the matching results.

Figure 2:
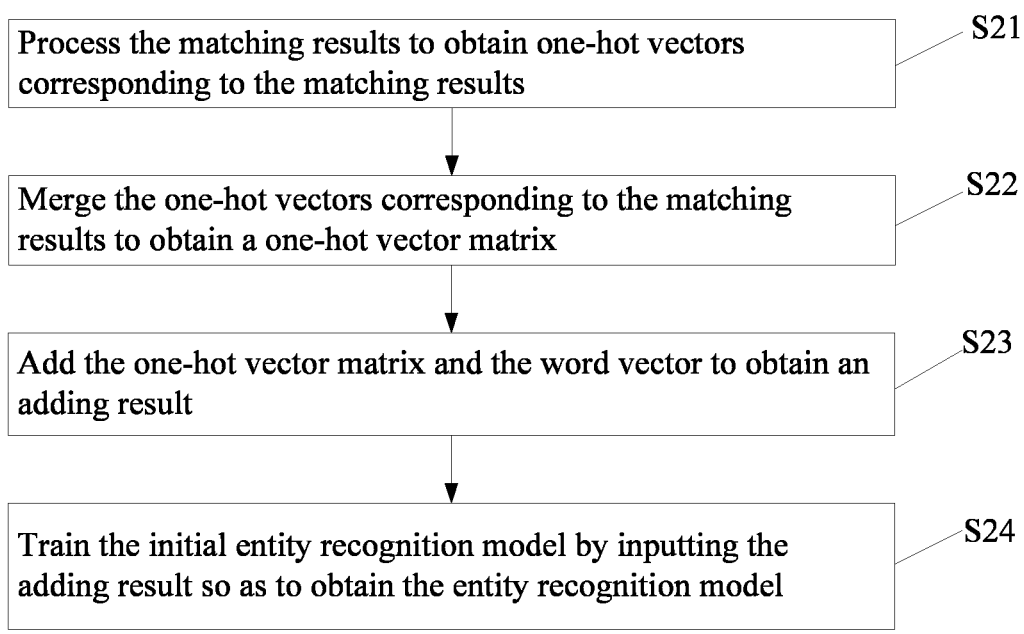
FIG. 2 is a flow chart of an example of step S12 and step S14 shown in FIG. 1.

FIG. 2 is a flow chart of an example of step S12 and step S14 shown in FIG. 1. In this embodiment, as shown in FIG. 2, the step S12 of processing the matching results to obtain the feature vectors corresponding to the matching results includes the following steps.

S21: processing the matching results to obtain one-hot vectors corresponding to the matching results.

For example, the entity in the sentence "I want to listen to Taylor Swift's Taylor Swift album." is "Taylor Swift", which will be processed to obtain the one-hot vectors. As an example, the position of the identified entity in the one-hot vectors can be marked with "1", and the remaining positions in the one-hot vectors can be marked with "0".

In this embodiment, in order to avoid the case that two entities cannot be distinguished when they are adjacent to each other, IOB format can be used for marking. For example, "Taylor" at the position B-singer is marked as 1, "Swift" at the position I-singer is marked as 1. In this way, "Taylor Swift" and "Lady Gaga" can be effectively marked even when they appear adjacently.

For example, the sentence "I want to listen to Taylor Swift's Taylor Swift album." is marked in the one-hot vectors in the form of B-I, where the one-hot vectors at the position B-singer is "0, 0, 0, 0, 0, 1, 0, 0, 1, 0, 0"; at the position I-singer is "0, 0, 0, 0, 0, 0, 1, 0, 0, 0, 0"; at the position B-album is "0, 0, 0, 0, 0, 0, 0, 0, 1, 0, 0"; at the position I-album is "0, 0, 0, 0, 0, 0, 0, 0, 0, 1, 0"; at the position B-song is "0, 0, 0, 0, 0, 0, 0, 0, 0, 0, 0"; and at the position I-song is "0, 0, 0, 0, 0, 0, 0, 0, 0, 0, 0".

S13: obtaining a word vector of each word in the training text by processing the training text.

In this embodiment, each word in the training text is processed to obtain a word vector $W_i$.

S14: training an initial entity recognition model based on the feature vector and the word vector to obtain an entity recognition model.

The initial entity recognition model is updated based on the obtained feature vector and word vector. As shown in FIG. 2, the step S14 includes the following steps.

S22: merging the one-hot vectors corresponding to the matching results to obtain a one-hot vector matrix.

For example, it merges the one-hot vectors obtained from the sentence "I want to listen to Taylor Swift's Taylor Swift album.", where at the position B-singer is "0, 0, 0, 0, 0, 1, 0, 0, 1, 0, 0"; at the position I-singer is "0, 0, 0, 0, 0, 0, 1, 0, 0, 0, 0"; at the position B-album is "0, 0, 0, 0, 0, 0, 0, 0, 1, 0, 0"; at the position I-album is "0, 0, 0, 0, 0, 0, 0, 0, 0, 1, 0"; at the position B-song is "0, 0, 0, 0, 0, 0, 0, 0, 0, 0, 0"; and at the position I-song is "0, 0, 0, 0, 0, 0, 0, 0, 0, 0, 0". They are merged to obtain the one-hot vector matrix of D={[0, 0, 0, 0, 0, 1, 0, 0, 1, 0, 0], [0, 0, 0, 0, 0, 0, 1, 0, 0, 0, 0], [0, 0, 0, 0, 0, 0, 0, 0, 1, 0, 0], [0, 0, 0, 0, 0, 0, 0, 0, 0, 1, 0], [0, 0, 0, 0, 0, 0, 0, 0, 0, 0, 0], [0, 0, 0, 0, 0, 0, 0, 0, 0, 0, 0]} which is a vector matrix of 6 rows and 11 columns, and the vector of each row is represented as the matching result of the 11 words with the database.

S23: adding the one-hot vector matrix and the word vector to obtain an adding result.

The one-hot vector matrix D obtained by the merging and the word vector Wi are added to obtain the adding result. For example, the adding result at the position "I" is W1+D, at the position "want" is W2+D, at the position "to" is W3+D, and at the position "album" is W11+D.

S24: training the initial entity recognition model by inputting the adding result so as to obtain the entity recognition model.

"W1+D", "W2+D", "W3+D", . . . , and "W11+D" are input into the initial entity model for training, thereby obtaining the entity recognition model.

In the present disclosure, when training the entity recognition model, the one-hot vectors are added as training corpuses, so as to improve the accuracy of the entity recognition model during entity recognition.

FIG. 3 is a flow chart of a first embodiment of an entity recognition method according to the present disclosure. In this embodiment, an entity recognition method is provided. The method is a computer-implemented method executable for a processor, which may be implemented through and applied to an entity recognition apparatus as shown in FIG. 5 or implemented through a computer-readable storage medium as shown in FIG. 6. As shown in FIG. 3, the method includes the following steps.

S31: obtaining a to-be-recognized text and performing entity recognition on the to-be-recognized text using an entity recognition model to obtain a plurality of recognition results.

For example, in the case that the to-be-recognized text is input as "X=(Check the weather in New York)", and the entity recognition model is used to perform entity recognition on it to output a plurality of recognition results such as Y1, Y2, . . . , and YM.

S32: outputting a tag sequence corresponding to the recognition results and performing probability calculation on the tag sequence.

For example, in the case that the to-be-recognized text is input as "X=(Check the weather in New York)", where the entity is "New York" which is a city. At this time, for example, the tag sequence of the output Y1 is (O, O, O, O, B-time, I-time), the tag sequence of the output Y2 is (O, O, O, O, B-city, I-city), the tag sequence of the output Y3 is (O, O, B-time, I-time, I-city, I-city), and the tag sequence of the output YM is (O, O, B-country, I-country, O, O). For the sake of clarity, the "," in the tag sequence (O, O, O, O, B-time, I-time) of Y1 is a separator between words.

After obtaining the tag sequence corresponding to each recognition result, probability calculation is performed thereon to obtain a probability corresponding to each tag sequence.

In one embodiment, when calculating the probability for each tag sequence, it needs to calculate a probability of obtaining each position corresponding to each tag sequence, that is, for example, in the case that the tag sequence of Y1 is (O, O, O, O, B-time, I-time), the probabilities at the positions corresponding to O, O, O, O, B-time, and I-time are respectively calculated. It further needs to calculate a transition probability of obtaining each position corresponding to each tag sequence. For example, in the case that the tag sequence of Y1 is (O, O, O, O, B-time, I-time), it needs to calculate the probability of B-time to transit to other positions, for example, the probability of transiting to the position I-time or the probability of transiting to the position O. For this, for example, when the number of tags in a tag sequence is n, the size of the transition probability matrix is (n×2)×(n×2), and a start position (START) and an end position (STOP) are additionally added. Eventually, the probability of the tag sequence is obtained according to the probability of each position and the transition probability of each position. The formula for calculating the probability of the tag sequence based on the probability of each position and the transition probability of each position can be:

$$s(X, y) = \prod_{i=0}^{n} A_{y_i, y_{i+1}} + \prod_{i=1}^{n} P_{i, y_i};$$

where, $P_{i, y_i}$ is the probability of the output at the i-th position as yi, $A_{y_i, y_{i+1}}$ is the transition probability from the tag yi to the tag yi+1, and s(X, y) is the probability of the tag sequence corresponding to the to-be-recognized text.

In one embodiment, when calculating the transition probability of each position corresponding to each tag sequence, if the transition position is transited from the i-th position to the i+1-th position, the tag at the i-th position is yi, and the tags at the i+1-th position is yi+1. As an example, in the matrix of (n+2)×(n+2), the transition probability corresponding to the position (yi, yi+1) is searched to obtain the transition probability from yi to yi+1.

The obtained probability s(X, y) of the tag sequence corresponding to the to-be-recognized text can be used to make up for the shortcomings of the deep learning model, because when the probability of a predicted sequence is high, not every position will output the tag corresponding to the maximum probability, and it needs also consider the problem of the above-mentioned transition probability, that is, the output rule needs to be complied with. For example, in an embodiment, in the case that the output tag sequence is [(START) B-singer, B-song, I-song, B-album, I-album, O, O, O, (STOP)], because the probability of transiting from the position B-singer to B-song in the transition probability matrix is very small or even negative, the probability s(X, y) of the tag sequence corresponding to the to-be-recognized text will not be very high, that is, it is not a sequence to be chosen.

In one embodiment, the transition probability between the entities that are impossible to be transited is limited by, for example, setting the non-transferable matrix as a negative number according to the actual condition. As an example, the following are the case that the transition is impossible to occur, that is, the case that the transition probability is 0:

(1) the tags in all positions of the transition probability matrix cannot be transited to the start position (START) of the transition probability matrix;
(2) the end position (STOP) of the transition probability matrix cannot be transited to other tags;
(3) the start position (START) cannot be transited to the tag beginning with I;
(4) all the tags O in the transition probability matrix cannot be transited to the tags beginning with I, for example, O cannot be transited to I-song;
(5) all the tags in the transition probability matrix which beginning with B cannot be transited to the tags beginning with I that are different from the word slots of the tag B, for example, B-singer cannot be transited to I-song; and
(6) all the tags in the transition probability matrix which beginning with I cannot be transited to the tags beginning with I that are different from the word slots of the tag I, for example, I-singer cannot be transited to I-song.

The forgoing 6 cases are the cases that the transition is impossible, that is, the cases that the transition probability is 0. In the process of training, since the probability will change, it is set to −10000 during training, so as to be conducive to convergence. In the prediction, the trained transition matrix is set to −10000 again during training, so as to avoid the probability of the transition matrix of these cases from changing in the process of training.

In one embodiment, after the probability is calculated, the accurate recognition result needs to be further verified to determine whether it is wrong or not, so as to further improve the accuracy rate of recognition. FIG. 4 is a flow chart of a second embodiment of an entity recognition method according to the present disclosure. In this embodiment, an entity recognition method is provided. The method is a computer-implemented method executable for a processor, which may be implemented through and applied to an entity recognition apparatus as shown in FIG. 5 or implemented through a computer-readable storage medium as shown in FIG. 6. As shown in FIG. 4, the method includes the following steps.

S41: determining whether the tag sequence with the highest probability has an enclosed word slot.

For instance, when performing entity recognition, the word slots are classified first, which are generally divide into two categories: one is enclosed word slots and the other is open word slots. The enclosed word slots refer to word slots having a limited value range, a few forms, and smaller changes, for example, city (city name), song-tag (song attribute), and so on. The open word slots refer to word slots having a wide value range, various forms, larger changes, and easy to overlap with other dictionary values, for example, song (song name), singer (singer name), and so on. An example of the reason why "song" is an open word slot is that the library of the songs all over the world from the ancient time to the modern time is large, which includes tens of millions or even hundreds of millions of songs while the

|  | B-time | I-time | B-singer | I-singer | . . . | O | <START> | <STOP> |
|---|---|---|---|---|---|---|---|---|
| B-time |  |  |  |  |  |  |  | −10000 |
| I-time |  |  | −10000 | −10000 | . . . | −10000 | −10000 | −10000 |
| B-singer |  |  |  |  |  |  |  | −10000 |
| I-singer | −10000 | −10000 |  |  | . . . | −10000 | −10000 | −10000 |
| . . . |  |  |  |  |  |  |  | −10000 |
| O |  |  |  |  |  |  |  | −10000 |
| <START> | −10000 | −10000 | −10000 | −10000 | . . . | −10000 | −10000 | −10000 |
| <STOP> |  |  |  |  |  |  |  | −10000 |

S33: outputting the tag sequence with the highest probability to use as an accurate recognition result corresponding to the to-be-recognized text.

After performing probability calculation on the tag sequence corresponding to each recognition result, the probability corresponding to each tag sequence is obtained, and the tag sequence with the highest probability is used as the accurate recognition result corresponding to the to-be-recognized text.

For example, in the case that the to-be-recognized text is input as "X=(Check the weather in New York)", where the entity is "New York" which corresponds to a city. At this time, as an example, the tag sequence of the output Y1 is (O, O, O, O, B-time, I-time), the tag sequence of the output Y2 is (O, O, O, O, B-city, I-city), the tag sequence of the output Y3 is (O, O, B-time, I-time, I-city, I-city), and the tag sequence of the output YM is (O, O, B-country, I-country, O, O). Through calculation, it can obtain that the probability that the tag sequence of Y1 is (O, O, O, O, B-time, I-time) is 0.1, the probability that the tag sequence of Y2 is (O, O, O, O, B-city, I-city) is 0.7, the probability that the tag sequence of Y3 is (O, O, B-time, I-time, I-city, I-city) is 0, and the probability that the tag sequence of YM is (O, O, B-country, I-country, O, O) is 0.2. At this time, the tag sequence Y2 with the highest probability is output as the accurate recognition result.

song name is various and may overlap with the city name such as Seattle or the book name such as "Cold Mountain".

As an example, in the case that the obtained accurate recognition result, that is, the tag sequence with the highest probability is (O, O, B-city, I-city, O, O, O, O), whether the tag sequence contains an enclosed word slot is determined. In which, B-city and I-city are enclosed word slots, that is, the tag sequence at this time contains enclosed word slots.

S42: extracting all the enclosed word slots in the recognition results to use as an enclosed word slot library, if the tag sequence with the highest probability have the enclosed word slot.

It is determined that the tag sequence with the highest probability contains enclosed word slots. At this time, all the enclosed word slots in the tag sequences of the plurality of recognized recognition results are extracted, that is, all the enclosed word slots in Y1, Y2, Y3, . . . , and YM are obtained to form an enclosed word slot library.

S43: matching the to-be-recognized text with the enclosed word slot library to obtain the enclosed word slot matching the to-be-recognized text, and updating the tag sequence with the highest probability to obtain the updated tag sequence to output as a best matching result of the to-be-recognized text.

The to-be-recognized text is matched with all the enclosed word slots in the enclosed word slot library. In the case that the to-be-recognized text contains "New York", if only "York" is recognized due to external circumstances during recognition, at this time, "New" can be added according to the matching with respect to the enclosed word slot library, so as to obtain the complete entity "New York".

In this embodiment, errors can be corrected through post-processing, so as to further improve the accuracy of entity recognition.

In comparison with entity recognition methods of the prior art that have the probability of the tag sequence with many parameters to be calculated and have a huge calculation amount, the above-mentioned entity recognition method of the present disclosure can effectively reduce the calculation amount and improve the computational efficiency by limiting the transition probability between a part of the entities that are impossible to be transited, that is, the case that transition probability is 0.

FIG. 5 is a schematic block diagram of an embodiment of an entity recognition apparatus according to the present disclosure. In this embodiment, an entity recognition apparatus is provided. As shown in FIG. 5, an entity recognition apparatus includes a storage 62 and a processor 63 connected to each other.

The storage 62 is configured to store instructions for implementing the above-mentioned entity recognition model training method and entity recognition method.

The processor 63 is configured to execute the instructions stored in the storage 62.

In which, the processor 63 can also be referred to as CPU (Central Processing Unit). The processor 63 can be an integrated circuit chip which has signal processing capability. The processor 63 may also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 62 can be a memory, a TF card, and the like, which may store all the information in the entity recognition apparatus including input original data, computer programs, intermediate execution results, and final execution results. It stores and retrieves information according to the position specified by a controller. With the storage 62, the entity recognition apparatus has memory function and can guarantee normal operation. The storage 62 in the entity recognition apparatus can be divided into a main memory (or internal memory) and an auxiliary memory (or external memory) according to usage, and it can also be classified to external memory and internal memory. The external storage is usually magnetic media or optical discs which can store information for a long time, and the internal memory refers to the storage component on a motherboard, which is used to store the data and programs currently being executed while only used to temporarily store the programs and data, and the data will be lost when the power is turned off or the power is cut.

In the embodiments provided by the present disclosure, it is to be understood that the disclosed methods and devices can be implemented in other ways. For example, the device embodiments described above are merely illustrative; the division of the modules or units is merely a division of logical functions, and can be divided in other ways such as combining or integrating multiple units or components with another system when being implemented; and some features can be ignored or not executed. In another aspect, the coupling such as direct coupling and communication connection which is shown or discussed can be implemented through some interfaces, and the indirect coupling and the communication connection between devices or units can be electrical, mechanical, or otherwise.

The units described as separated components can or cannot be physically separate, and the components shown as units can or cannot be physical units, that is, can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a non-transitory computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure.

FIG. 6 is a schematic block diagram an embodiment of a computer-readable storage medium according to the present disclosure. In this embodiment, a computer-readable storage medium is provided. As shown in FIG. 6, the storage medium stores a program file 71 capable of implementing the above-mentioned entity recognition model training method and entity recognition method. In which, the program file 71 can be stored in the above-mentioned storage medium in the form of a software product, which includes a plurality of instructions to make a computer device (e.g., a personal computer, a server, and a network device) or a processor to execute all or part of the steps of the methods in the foregoing embodiments. The above-mentioned storage medium includes a variety of media such as a USB disk, a mobile hard disk, a read-only memory (ROM), a random access memory (RAM), a magnetic disk, or an optical disk which is capable of storing program codes, or a terminal device such as a computer, a server, a mobile phone, a tablet, and the like.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented entity recognition method for an entity recognition model, comprising:

providing a computer device comprising a non-transitory storage and a processor connected to each other, wherein the non-transitory storage stores an entity recognition model;

obtaining, by the processor, a to-be-recognized text, inputting the to-be-recognized text into the entity recognition model for performing entity recognition on the to-be-recognized text, and obtaining a plurality of recognition results, wherein the entity recognition model is a deep learning based entity recognition model;

outputting, by the processor, a tag sequence corresponding to the recognition results and performing probability calculation on the tag sequence; and outputting, by the processor, the tag sequence with the highest probability via a user interface to use as an accurate recognition result corresponding to the to-be-recognized text;

wherein the step of outputting, by the processor, the tag sequence corresponding to the recognition results and performing probability calculation on the tag sequence comprises:

calculating, by the processor, a probability of obtaining each position corresponding to each tag sequence;

calculating, by the processor, a transition probability of obtaining each position corresponding to each tag sequence; and obtaining, by the processor, a probability of the tag sequence according to the probability of each position and the transition probability of each position; and wherein the step of obtaining, by the processor, the probability of the tag sequence according to the probability of each position and the transition probability of each position comprises:

calculating, by the processor, the probability of the tag sequence through the formula of:

$$s(X, y) = \prod_{i=0}^{n} A_{y_i, y_{i+1}} + \prod_{i=1}^{n} P_{i, y_i};$$

where, $P_{i,y_i}$ is the probability of the output of the i-th position being the tag of $y_i$, $A_{y_i, y_{i+1}}$ is the transition probability from the tag $y_i$ to the tag $y_{i+1}$, and s(X, y) is the probability of the tag sequence corresponding to the to-be-recognized text;

wherein the method further comprises:

obtaining, by the processor, a training text stored in the non-transitory storage, matching the training text with a database by accessing the database electronically, and obtaining a plurality of entities as matching results;

processing, by the processor, the matching results to obtain a plurality of feature vectors corresponding to the matching results;

obtaining, by the processor, a word vector corresponding to each word in the training text by processing the training text; and training, by the processor, an initial entity recognition model based on the feature vector and the word vector to obtain the entity recognition model.

2. The method of claim 1, wherein the step of outputting, by the processor, the tag sequence with the highest probability to use as the accurate recognition result corresponding to the to-be-recognized text comprises:

verifying, by the processor, the tag sequence with the highest probability to determine whether the tag sequence with the highest probability is the accurate recognition result corresponding to the to-be-recognized text.

3. The method of claim 2, wherein the step of verifying, by the processor, the tag sequence with the highest probability to determine whether the tag sequence with the highest probability is the accurate recognition result corresponding to the to-be-recognized text comprises:

determining, by the processor, whether the tag sequence with the highest probability has an enclosed word slot;

extracting, by the processor, all the enclosed word slots in the recognition results to use as an enclosed word slot library, in response to the tag sequence with the highest probability having the enclosed word slot; and matching, by the processor, the to-be-recognized text with the enclosed word slot library to obtain the enclosed word slot matching the to-be-recognized text, and updating the tag sequence with the highest probability to obtain the updated tag sequence to output as a best matching result of the to-be-recognized text.

4. The method of claim 1, further comprising limiting, by the processor, the transition probability in case that the transition is impossible to occur.

5. The method of claim 4, wherein the situation of the transition being impossible to occur includes:

tags in all positions of a transition probability matrix be transited to a start position (START) of the transition probability matrix;

a tag in an end position (STOP) of the transition probability matrix be transited to other positions;

a tag in the start position (START) be transited to positions of tags beginning with I;

tags O in the transition probability matrix be transited to the positions of the tags beginning with I;

tags in the transition probability matrix beginning with B be transited to the positions of the tags beginning with I, whose word slots are different from word slots of the tags beginning with B; and tags in the transition probability matrix beginning with I be transited to the positions of the tags beginning with I, whose word slots are different from the word slots of the tags beginning with I.

6. The method of claim 1, wherein the to-be-recognized text is obtained during a dialogue with a user and the computer device.

7. The method of claim 4, wherein the step of processing, by the processor, the matching results to obtain a plurality of feature vectors corresponding to the matching results comprises:

processing, by the processor, the matching results, and obtaining one-hot vectors corresponding to the matching results, wherein a position of an identified entity in the one-hot vectors is marked with 1, and remaining positions in the one-hot vectors are marked with 0; and wherein the step of training, by the processor, the initial entity recognition model based on the feature vector and the word vector to obtain the entity recognition model comprises:

merging, by the processor, the one-hot vectors corresponding to the matching results to obtain a one-hot vector matrix;

adding, by the processor, the one-hot vector matrix and the word vector, and obtaining an adding result; and obtaining, by the processor, the entity recognition model by inputting the adding result into the initial entity model for training, and storing the obtained entity recognition model in the non-transitory storage.

8. An entity recognition apparatus, comprising:
a processor; and
a non-transitory memory coupled to the processor;
wherein the non-transitory memory is configured to store a computer program executable on the processor, and the computer program comprises:
instructions for obtaining a training text stored in the non-transitory memory, matching the training text with a database by accessing the database electronically, and obtaining a plurality of entities as matching results;
instructions for processing the matching results, and obtaining one-hot vectors corresponding to the matching results, wherein a position of an identified entity in the one-hot vectors is marked with 1, and remaining positions in the one-hot vectors are marked with 0;
instructions for obtaining a word vector corresponding to each word in the training text by processing the training text;
instructions for merging the one-hot vectors corresponding to the matching results to obtain a one-hot vector matrix;
instructions for adding the one-hot vector matrix and the word vector, and obtaining an adding result; and
instructions for obtaining an entity recognition model by inputting the adding result into an initial entity model for training, and storing the obtained entity recognition model in the non-transitory memory, wherein the initial entity model is a deep learning based entity recognition model;
wherein the computer program further comprises:
instructions for obtaining a to-be-recognized text and performing entity recognition on the to-be-recognized text using the entity recognition model to obtain a plurality of recognition results;
instructions for outputting a tag sequence corresponding to the recognition results and performing probability calculation on the tag sequence; and
instructions for outputting the tag sequence with the highest probability via a user interface to use as an accurate recognition result corresponding to the to-be-recognized text;
wherein the instructions for outputting the tag sequence corresponding to the recognition results and performing probability calculation on the tag sequence comprise:
instructions for calculating a probability of obtaining each position corresponding to each tag sequence;
instructions for calculating a transition probability of obtaining each position corresponding to each tag sequence; and
instructions for obtaining a probability of the tag sequence according to the probability of each position and the transition probability of each position; and
wherein the instructions for obtaining the probability of the tag sequence according to the probability of each position and the transition probability of each position comprise:

instructions for calculating the probability of the tag sequence through the formula of:

$$s(X, y) = \prod_{i=0}^{n} A_{y_i, y_{i+1}} + \prod_{i=1}^{n} P_{i, y_i}.$$

wherein, $P_{i,y_i}$ is the probability of the output of the i-th position being the tag of $y_i$, $A_{y_i,y_{i+1}}$ is the transition probability from the tag $y_i$ to the tag $y_{i+1}$, and $s(X, y)$ is the probability of the tag sequence corresponding to the to-be-recognized text.

9. The apparatus of claim 8, wherein the instructions for outputting the tag sequence with the highest probability to use as the accurate recognition result corresponding to the to-be-recognized text comprise:
instructions for verifying the tag sequence with the highest probability to determine whether the tag sequence with the highest probability is the accurate recognition result corresponding to the to-be-recognized text.

10. The apparatus of claim 9, wherein the instructions for verifying the tag sequence with the highest probability to determine whether the tag sequence with the highest probability is the accurate recognition result corresponding to the to-be-recognized text comprise:
instructions for determining whether the tag sequence with the highest probability has an enclosed word slot;
instructions for extracting all the enclosed word slots in the recognition results to use as an enclosed word slot library, in response to the tag sequence with the highest probability having the enclosed word slot; and
instructions for matching the to-be-recognized text with the enclosed word slot library to obtain the enclosed word slot matching the to-be-recognized text, and updating the tag sequence with the highest probability to obtain the updated tag sequence to output as a best matching result of the to-be-recognized text.

11. The apparatus of claim 8, wherein the computer program further comprises limiting the transition probability in case that the transition is impossible to occur.

12. The apparatus of claim 11, wherein the situation of the transition being impossible to occur includes:
tags in all positions of a transition probability matrix be transited to a start position (START) of the transition probability matrix;
a tag in an end position (STOP) of the transition probability matrix be transited to other positions;
a tag in the start position (START) be transited to positions of tags beginning with I;
tags O in the transition probability matrix be transited to the positions of the tags beginning with I;
tags in the transition probability matrix beginning with B be transited to the positions of the tags beginning with I, whose word slots are different from word slots of the tags beginning with B; and
tags in the transition probability matrix beginning with I be transited to the positions of the tags beginning with I, whose word slots are different from the word slots of the tags beginning with I.

* * * * *